Oct. 14, 1958     J. McCALLUM     2,856,446
RECTIFYING SECONDARY CELL
Filed June 3, 1954
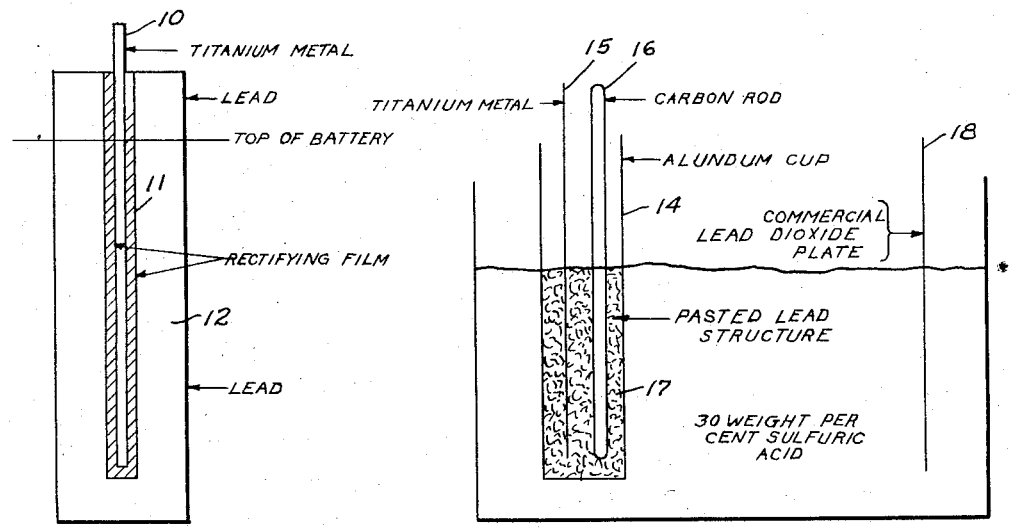
*Fig.1*         *Fig.2*
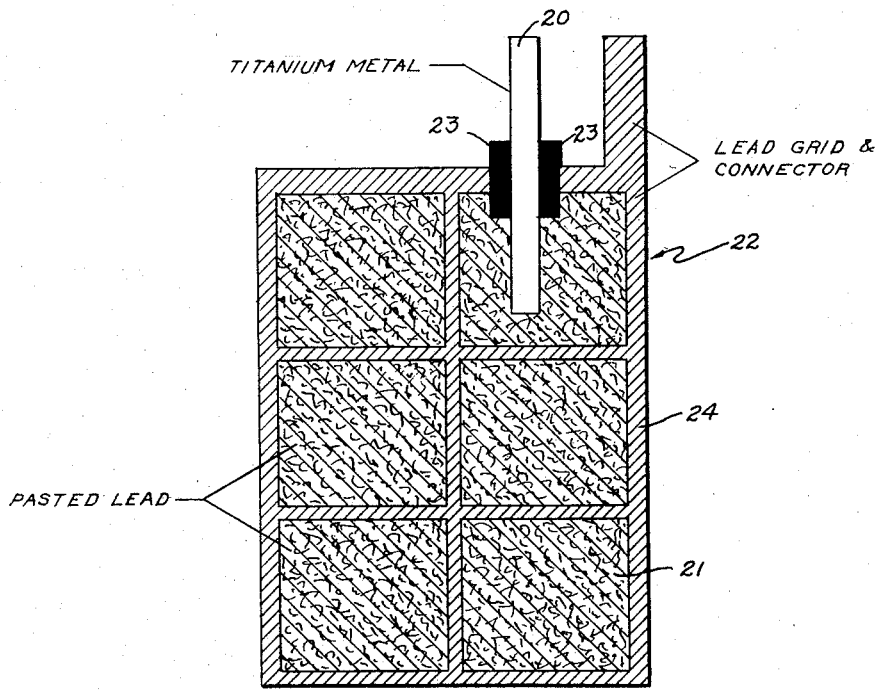
*Fig.3*
INVENTOR.
JOHN McCALLUM
BY
ATTORNEYS

United States Patent Office 2,856,446
Patented Oct. 14, 1958

2,856,446

RECTIFYING SECONDARY CELL

John McCallum, Columbus, Ohio, assignor, by mesne assignments, to Remington Arms Company, Inc., Bridgeport, Conn., a corporation of Delaware Application June 3, 1954, Serial No. 434,180

6 Claims. (Cl. 136—26)

This invention relates to secondary or storage cells, and contemplates a secondary cell having integrated therewith a rectifying electrode by the use of which the cell may be charged by the direct application of alternating current without the necessity for outside current rectification.

In the past, many attempts have been made to incorporate rectification units physically inside of storage or secondary batteries. Most of these attempts involved the use of dry-type metallic rectifiers, such as selenium rectifiers. Many difficulties arose in these attempts, such as the large physical size required by the rectifiers in order to obtain the necessary current-carrying capacity, the cost of inserting the rectifiers in the batteries, and also the corrosive effect of battery electrolytes on the rectifier materials.

It has now been found that by inserting a rectifying electrode of a metal upon which a rectifying film may be formed, such as titanium, zirconium, or tantalum, in a storage battery, a wet-cell-type rectifier is provided that requires a minimum of space, is very economical, and is not adversely affected by the battery electrolytes. In the type of rectifier contemplated by this invention for use in secondary cells, the allowable current density in the rectifier is independent of the psysical size of the component and is limited only by the temperature rise occurring when current is passed through a battery.

In the drawings:

Fig. 1 is a diagrammatic representation of one form of rectifying electrode according to the present invention;

Fig. 2 is a supplement diagrammatic representation of a secondary cell comprising a rectifying electrode according to the present invention; and Fig. 3 is a sectional elevation showing the application of a rectifying electrode to a cell comprising a conventional lead-plate grid.

The invention comprises the discovery that a rectifying film can be formed on the surface of various metals, such as titanium, tantalum, or zirconium, which film is stable in the usual acids or alkaline secondary cell electrolyte, and that metal thus filmed forms a rectifying electrode which can be built into a conventional storage cell, say of a lead plate-sulfuric acid type, and, when connected to a source of alternating current, will recharge the cell.

Numeral 10 (Fig. 1) identifies a rod or plate of titanium, tantalum, or zirconium, bearing a rectifying surface film 11. A counter-electrode 12 of lead is juxtaposed on the rectifying film. Using an alkaline lead plating bath, such as is disclosed in U. S. Patent No. 2,474,092, issued to A. W. Liger, on June 21, 1949, and alternating current at about 1.5 volts, it has been found possible to plate on to the film up to at least 2 mils of finegrain lead, thus forming a complete and unitary rectifying cell. In this operation, the bath temperature should be less than 170° F. For some uses, however, it may be desirable to form the rectifier as shown in Fig. 2, in which an alundum cup 14 contains a plate or rod 15 of filmed titanium and a direct-current electrode 16 which may be a carbon rod. Surrounding the spaced-charging electrode 15 and discharging electrode 16 is a spongy mass 17 of essentially the composition of a pasted-lead grid of a lead-plate storage battery. This composition may comprise 10 parts of litharge (PbO), 1 part of red lead ($Pb_3O_4$), and 0.1 part of barium sulfate ($BaSO_4$). The cell further comprises a positive electrode 18 of commercial construction and a conventional electrolyte of about 30% of sulfuric acid. Charging is effected by connecting an alternating current between the titanium plate 15 and the positive electrode 18, while the discharge circuit is fed from the rod 16 to the electrode 18. The presence of a film at the surface of the rectifying electrode is essential, since electrical contact between the charging electrode and the spongy lead mass prevents rectification. Such a cell may be repeatedly charged and discharged, the charging alternating-current voltage being somewhat higher than the discharge voltage.

The filmed electrode will rectify at very high-current density, the rectifying capacity being substantially independent of its area. Thus, as illustrated in Fig. 3, a rectifying filmed electrode 20 of relatively small area may be embedded in the pasted lead structure 21 of a lead-grid anode 22 of substantially greater area. Insulation 23 separates electrode 20 from the lead frame 24 of grid 22. The only limit to the current density at the charging electrode surface appears to be one at which local heating would destroy the rectifying film or boil the electrolyte. The temperature at the surface of the rectifying electrode should not exceed 160° F.

In the preferred method of preforming the rectifying film on the charging electrode, the unfilmed electrode is first placed in position in a battery, for example, as shown in Fig. 3, in contact with the lead paste. In other types of secondary batteries, the electrode would, of course, be in contact with anodes of different materials. Then, an alternating voltage is applied between the rectifying or charging electrode and the cathode of the battery. The voltage at which the film will be formed depends upon the electrolyte of the cell. For example, when the electrolyte consists of an admixture of sulfuric acid and phosphoric acid, the titanium film-formation voltage is about 45 volts. In other electrolytes, such as sulfuric acid at various concentrations, and sodium hydroxide, the titanium film-formation voltage is not over 5 volts.

The rectifying films are not attacked by alkaline or acidic electrolytes, such as strong sulfuric acid, and in use assume the characteristics of the electrolyte in which they are placed. Thus, even though a film is formed on titanium at 45 volts in the aforementioned sulfuric acid-phosphoric acid solution, it will rectify at about 5 volts in a 20% sulfuric acid solution in the same manner as one formed in the sulfuric acid solution. For best results, the applied A. C. voltage should be slightly above the voltage at which the film forms.

The films formed on charging electrodes of titanium, tantalum, and zirconium, as above, do not rectify when dry, but are, instead, highly resistant. In suitable solutions, rectification ratios as high as 350:1 have been secured.

While this invention has been described particularly in reference to the use of rectifying electrodes of titanium, zirconium, or tantalum, electrodes of other metals may also be used. Any metal that forms a rectifying film in a particular electrolyte may be used in a battery employing that electrolyte. Titanium, zirconium, and tantalum have been particularly mentioned in view of the fact that they form rectifying films in the more commonly used secondary cell electrolytes, and they are not substantially corroded thereby.

What is claimed is:

1. A secondary cell comprising, in a single uncompartmented container: an electrolyte; a positive electrode, a negative electrode, and a charging electrode, immersed in said electrolyte; said charging electrode comprising a metallic member adjacent said negative electrode and having a rectifying film thereon contacting said negative electrode; said cell being chargeable by connecting an alternating voltage between said charging electrode and said positive electrode.

2. A secondary cell according to claim 1, in which said metallic member is made of a material selected from the group consisting of titanium, zirconium, and tantalum.

3. A secondary cell according to claim 1, in which said metallic member is made of titanium.

4. A secondary cell according to claim 1, in which said metallic member is made of zirconium.

5. A secondary cell according to claim 1, in which said metallic member is made of tantalum.

6. A secondary cell comprising, in a single uncompartmented container: an electrolyte; a positive electrode immersed in said electrolyte; a negative electrode comprising a porous material immersed in said electrolyte; and a charging electrode comprising a metallic member having a rectifying film thereon immersed in said electrolyte and embedded in said porous material of said negative electrode; said cell being chargeable by connecting an alternating voltage between said charging electrode and said positive electrode.

References Cited in the file of this patent

UNITED STATES PATENTS

| | | |
|---|---|---|
| 431,447 | Dixon | July 1, 1890 |
| 780,365 | Melzer | Jan. 17, 1905 |
| 1,012,889 | Mershon | Dec. 26, 1911 |
| 1,065,704 | Mershon | June 24, 1913 |
| 1,533,906 | Threm | Apr. 14, 1925 |
| 2,076,238 | Jumau | Apr. 6, 1937 |
| 2,641,622 | Higgins et al. | June 9, 1953 |
| 2,653,180 | Hignett et al. | Sept. 22, 1953 |

FOREIGN PATENTS

| | | |
|---|---|---|
| 848 of 1898 | Great Britain | Jan. 11, 1898 |
| 594,697 | France | May 31, 1924 |

OTHER REFERENCES

"Storage Batteries," Vinal, third edition, 1940, pages 270, 271.